April 22, 1930.  C. MOTT  1,755,789
MACHINE FOR CUTTING IRREGULAR SHAPES
Filed Feb. 14, 1928   3 Sheets-Sheet 1

INVENTOR:
CHESTER MOTT,
BY
ATTORNEY.

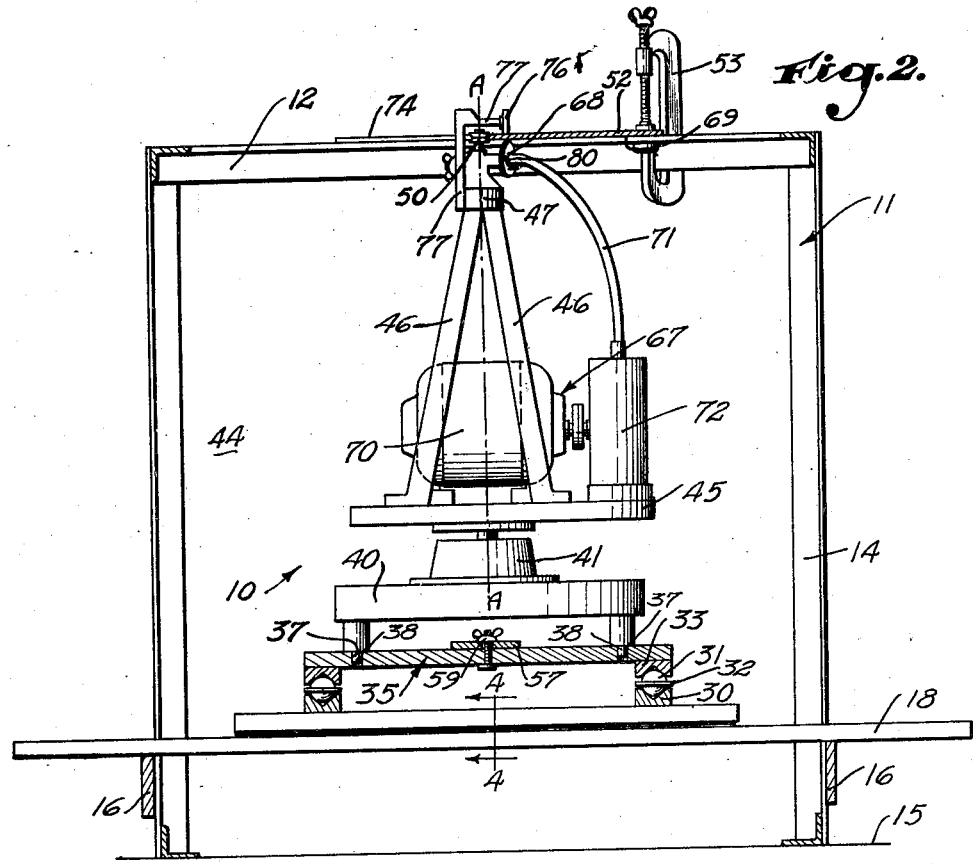
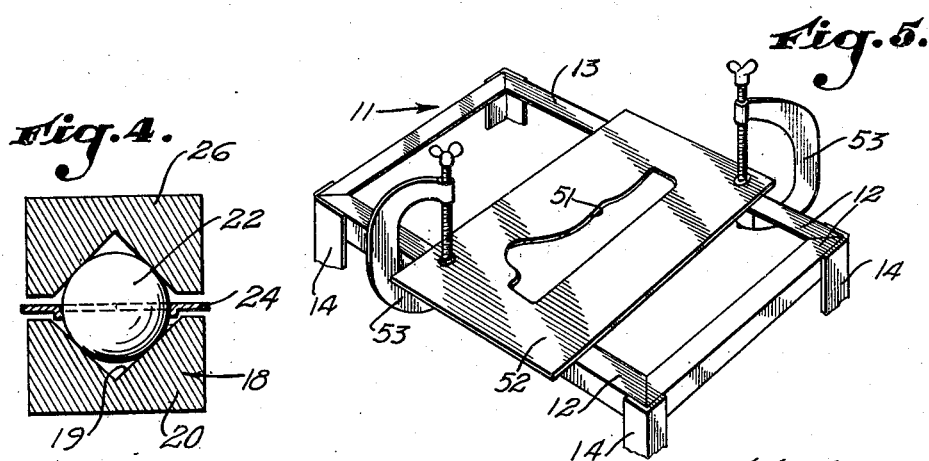

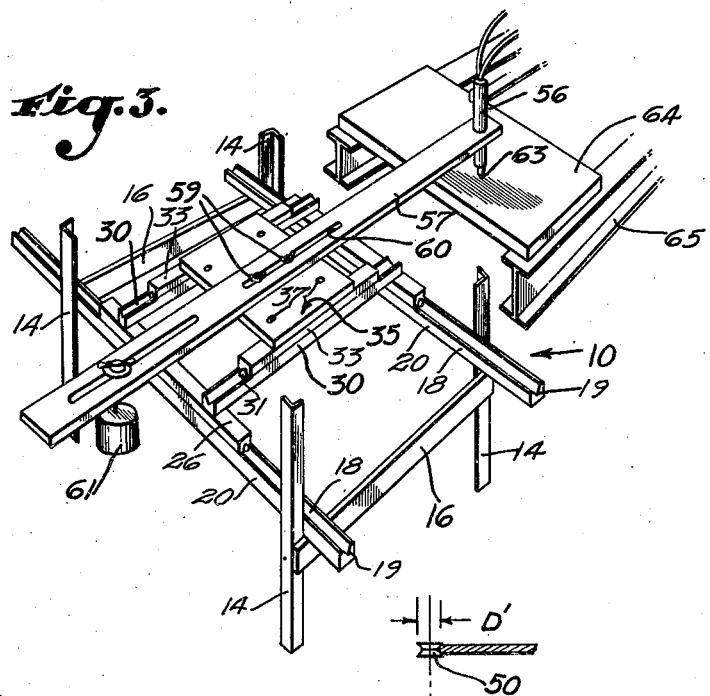
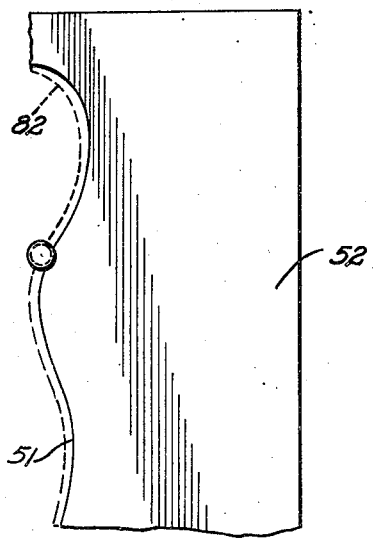
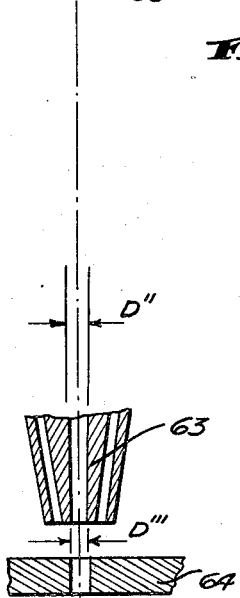

Patented Apr. 22, 1930

1,755,789

UNITED STATES PATENT OFFICE

CHESTER MOTT, OF DENVER, COLORADO, ASSIGNOR, BY MESNE ASSIGNMENTS, TO UNION CARBIDE AND CARBON RESEARCH LABORATORIES, INC., A CORPORATION OF NEW YORK

MACHINE FOR CUTTING IRREGULAR SHAPES

Application filed February 14, 1928. Serial No. 254,215.

This invention has to do with apparatus for cutting irregular shapes in metal plates, and is embodied in the combination of mechanism for moving a cutting means adjacent to a sheet of metal to be cut, by means which causes the cutting means to follow a path in accordance with a templet.

In accomplishing this result, I mount a templet above a floating table, any point on this table following a path corresponding to the contour of the templet when a guide roller is moved along the contour edge of the templet. This floating table carries a cutting medium which is adapted to cut the irregular opening in the plate.

It is an object of my invention to provide a device for cutting irregular shapes in a plate which includes a floating table carrying a plate-cutting medium, this table moving through a path defined by the contour of a templet.

The device of my invention has a guide roller which is pivotally secured on a guiding structure carried by the floating table. This guide roller is kept in contact with the contour edge of the templet by mechanical means which, in the preferred embodiment, consists of a roller engaging a face of the templet and lying in a plane oblique to the tangent to the contour edge of the templet at the point of contact of the guide roller and this edge.

It is an object of my invention to provide a mechanical means of keeping a guide member in contact with a templet which comprises a roller which bears against one face of the templet, the plane of this roller being oblique to the tangent drawn to the contour edge of the templet at the point of contact of the guide member and the contour edge of the templet A further object of my invention is to provide a mechanism for driving such an oblique roller so that the guide member is automatically moved along the edge of the templet and in contact therewith.

Another object is to provide a mechanism which is particularly adapted to cut various shapes of slots or openings in metal plates, and one which may include a torch as the cutting instrumentality.

Further objects of my invention lie in the novel construction and arrangement of the constituent parts of my invention.

Still further objects and advantages of my invention will be made evident hereinafter.

One form of my invention is shown in the drawings, in which—

Fig. 2 is a side view taken in the direction of the arrow 2 of Fig. 1.

Fig. 3 is a cut-away perspective view illustrating the relationship between the cutting torch and the floating table of my invention.

Fig. 4 is a sectional view taken on the line 4—4 of Fig. 2.

Fig. 5 is a perspective view of the upper portion of the frame, showing the means for clamping the templet thereto.

Figs. 6 and 7 are diagrammatic views illustrating the utility of having the radii of the guide roller and the cutting flame equal.

Figure 1:
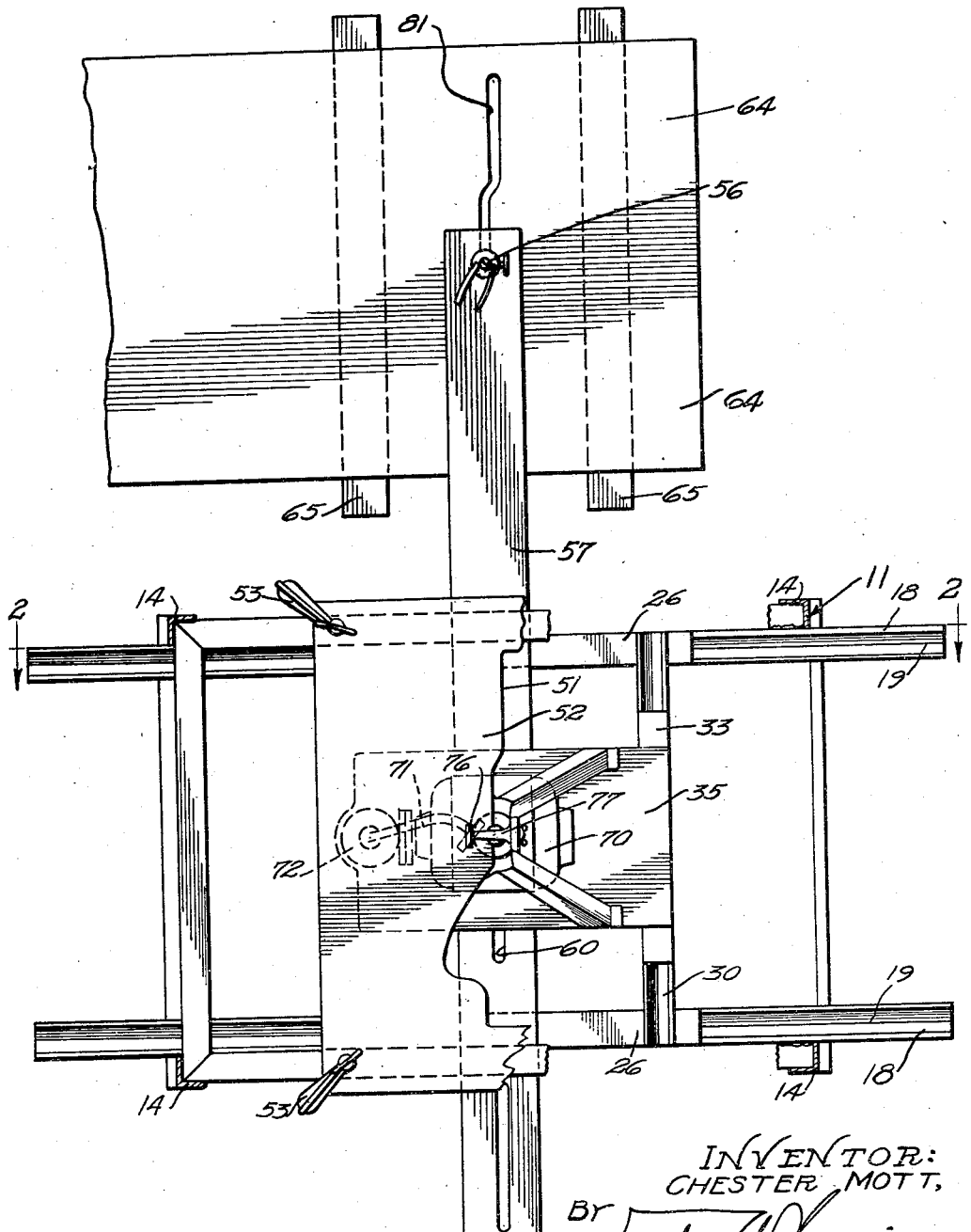
Fig. 1 is a top view of the complete apparatus of my invention.

Referring particularly to Figs. 1, 2, 3, and 5, the slot-cutting mechanism 10 of my invention is mounted in a frame 11 which may conveniently be formed of angle-iron, as illustrated in the drawings. The frame 11 has upper angle-iron bars 12 which are suitably welded together so as to form a rectangular structure 13, best illustrated in Fig. 5. This rectangular structure is suitably secured to four legs 14 which extend downward and rest upon a floor-surface 15. Cross members 16 secure opposite pairs of the legs 14 together.

Resting on the cross members 16 is a pair of longitudinal ways 18 which are parallel to the upper surface of the rectangular structure 13. As best illustrated in Figs. 3 and 4, these longitudinal ways 18 are formed by milling a V-groove 19 in a rectangular bar 20. Ball bearings 22 are adapted to engage the walls of the V-groove 19 in a manner best illustrated in Fig. 4, these bearings being held in spaced relationship by a ball retainer 24 formed of a thin material. Resting on the balls 22 in each longitudinal way 18 is a longitudinal V-block 26 which is similar in cross-sectional shape to the longitudinal way 18. The longitudinal V-blocks 26 are, however, materially shorter than the ways 18.

Extending between the longitudinal V-blocks 26, and preferably perpendicular thereto, are lateral ways 30 carrying balls 31 mounted in retainers 32. Lateral V-blocks 33 are supported by these balls. These lateral ways 30 and V-blocks 33 may be exactly similar in cross-section to the longitudinal ways and V-blocks.

Supported on the lateral V-blocks 33 is a floating table 35. This floating table may be moved in any direction in a horizontal plane, any longitudinal movement being allowed for by the ways 18 and any lateral movement being allowed for by the ways 30. It is impossible, however, to rotate the floating table 35 about any vertical axis passing therethrough, due to the action of the ways 18 and 30.

The floating table 35 has openings 37 therein which are adapted to receive pegs 38 of a base 40 of my invention. These pegs allow the base to be lifted from engagement with the floating table. Pivoted in a hub 41 of the base 40, and on a vertical axis A—A passing through this base, is a guide structure 44 which comprises a plate 45 having end frames 46 extending upward therefrom, these end frames meeting in a cast member 47. Pivotally mounted on the casting 47, and on the axis A—A is a guide means in the form of a guide roller 50 of my invention.

The guide roller 50 is suitably formed to engage a contour edge 51 of a templet 52 which is clamped to the upper surface of the rectangular structure 13 by means of clamps 53. By moving the guiding structure 44 in a manner so that the guide roller 50 is kept in contact with the contour edge 51 of the templet 52, any point on the floating table 35 will describe a locus identical with that given to the axis A—A. This locus will not be identical with the contour of that portion of the templet 52 over which the guide roller 50 has moved, inasmuch as the diameter of the guide roller changes this motion slightly in a manner to be brought out.

This motion of the floating table 35 is transmitted to a cutting torch 56 which is mounted on an arm 57 adjustably secured to the floating table 35 by means of thumb screws 59 which are threaded on bolts passing through a longitudinal opening 60 of the arm 57. The weight of the cutting torch 56 and its attached hose, etc., is counterbalanced by a weight 61 adjustably secured to that end of the arm 57 which lies on the opposite side of the floating table 35 from the torch 56. This counterbalance weight 61 permits an exact counterbalancing of the arm 57 so that the weight of the arm, and its attached counterbalancing weight 61 and cutting torch 56, may be equally distributed between the balls 22. Spaced a short distance below a tip 63 of the torch 56 is a plate 64 in which the irregular outline corresponding to the contour of the templet 52 is to be cut. This plate 64 is mounted in a horizontal plane on I-beams 65 or some such supporting structure.

The guide roller 50 may be manually moved along the contour edge of the templet 52, if desired, but I prefer to perform this operation mechanically by a suitable driving means 67 carried by the guiding structure 44. This driving means is best illustrated in Figs. 1 and 2 and comprises a driving roller 68 suitably pivoted to the casting 47, this driving roller engaging a lower face 69 of the templet 52. The roller 68 may be formed of rubber, felt, leather, or similar substances, and is driven by a suitable motor 70 through a flexible connection 71. A speed-reduction gearbox 72 is interposed between the motor and the driving roller 68 so that the speed of the latter is materially lower than the speed of the former. Adapted to engage an upper surface 74 of the templet 52 is a follower roller 76 which is pivoted to a structure 77. The structure 77 is vertically adjustable relative to the casting 47 so as to compensate for any difference in thickness of different templets, and also for any small amount of wear on the driving roller 68. As best illustrated in Fig. 2, the driving roller 68 and the follower roller 76 are disposed in intersecting planes. The angle between these intersecting planes is not variable in the form shown in the drawings, but might be made so, if desired.

When in operation, the guiding structure 44 is rotated about the axis A—A until the follower roller 76 is in a plane substantially parallel to the tangent to the contour edge of the templet at the point of contact between this edge and the guide roller 50. At this time, the driving roller 68 will be disposed in a plane non-parallel to the plane including this tangent. In other words, the plane of the driving roller 68 will be oblique to, and intersected by, the tangent to the contour edge 51 of the templet 52, this tangent being drawn at the point of contact between the guide roller 50 and the edge 51. If at this time, the motor 70 is set into operation so that the driving roller 68 turns in a direction indicated by the arrow 80, this drive roller will slide on the lower face 69 of the templet 52 and will exert a force tending to move the guide roller 50 along the edge of the templet 52 and at the same time will exert a force holding this guide roller in firm contact with this edge. The speed at which the guide roller travels along this edge will be proportional to the cosine of the angle of obliquity of the driving roller 68 relative to the tangent to the contour edge. The guiding roller 50 will thus automatically move along the contour edge of the templet 52 and in so doing will move the floating table 35 through a path defined by the templet 52. This motion is transmitted to the torch 56 by the arm 57, as previously described and if a suitable cutting flame issues from this torch, a groove 81 will be cut in the plate 64.

Referring now to Figs. 6 and 7, it should be clear that the locus of a point in the axis A—A will not describe a curve identical with the contour edge 51 of the templet 52, but instead will define a locus indicated by dotted line 82 of Fig. 6. Thus, if the cutting flame issuing from the torch 56 were to be of infinitesimal diameter, the slot 81 would conform to the curve indicated by the dotted line 82. If, however, the effective diameter of the flame issuing from the tip 63 of the cutting torch 56 is exactly equal to the effective diameter of the guide roller 50, the slot 81 cut in the plate 64 will be identical with the contour edge 51 of the templet 52. This is an extremely desirable condition and is illustrated best in Fig. 7 where D' indicates the effective diameter of the guide roller 50, D'' indicates the diameter of the opening through the cutting tip 63, and D''' indicates the effective diameter of the slot cut in the plate 64. The relationship between D'' and D''' will depend upon the type of tip used, upon the amount that the flame flares after leaving the tip, and also upon the distance between the tip and the plate 64. It is entirely possible to so proportion these variables that the diameter of the slot cut is exactly equal to D'.

The angle of obliquity between the driving roller 68 and the tangent to the contour edge 51 may be varied by rotating the guiding structure 44 about the axis A—A. It is preferable to keep the arm of the structure 77, to which the follower roller 76 is pivoted, substantially perpendicular to the tangent to this contour edge, and the angle of obliquity is so set that when this occurs the correct speed will be transmitted to the cutting torch 56. In cutting certain designs, it is unnecessary for an attendant to watch the machine, but in cutting complex curves where the radius of curvature is small, it may be necessary for the operator to rotate the guiding structure 44 about the axis A—A as the cutting progresses.

It should be clearly understood that my device is not applicable alone to cutting metallic plates. The mechanism disclosed may find other utilities in various other arts such, for instance, as the etching art, or may be utilized for cutting other types of materials by providing suitable cutting means on the arm 57.

Also, it will be appreciated that while the mechanism illustrated and described is particularly adapted to cut slots in metal by means of a torch, other forms of cutting means may be employed and various shapes of templets may be used for cutting openings or other contours of various sizes and shapes.

I claim as my invention:

1. In a machine for cutting irregular slots in a plate, the combination of: a floating table; a templet; a guide roller engaging a contour edge of said templet; a driving roller engaging a face of said templet; means for rotating said driving roller, said means permitting a variation of the angle between the plane of said driving roller and a plane including the tangent to said contour edge at the point of contact between said guide roller and said contour edge; and means carried by said floating table for cutting said plate, said last-named means moving through a path followed by said guide roller.

2. In a machine of the nature disclosed, the combination of: a templet; a guide means engaging the contour edge of said templet; a driving roller engaging a face of said templet and adapted to draw said guide means along the contour edge of said templet; and means guided by said guide means for operating on a piece of work, the plane of said driving roller being perpendicular to the plane of said face and non-parallel to the tangent to said contour edge at the point of contact between said edge and said guide means.

3. In a machine of the nature disclosed, the combination of: a templet; a guide means engaging the contour edge of said templet; a driving roller engaging a face of said templet and adapted to draw said guide means along the contour edge of said templet; and means guided by said guide means for operating on a piece of work, said driving roller engaging one face of said templet at an angle oblique to the tangent to the contour edge of said templet at the point of contact between said edge and said guide means, the angle of obliquity determining the velocity of said guide means along said contour edge.

4. In a machine of the nature disclosed, the combination of: a templet; a guide means engaging the contour edge of said templet; a driving roller engaging a face of said templet and adapted to draw said guide means along the contour edge of said templet; and means guided by said guide means for operating on a piece of work, said driving roller engaging one face of said templet at an angle oblique to the tangent to the contour edge of said templet at the point of contact between said edge and said guide means, the angle of obliquity being variable.

5. In a machine of the nature disclosed, the combination of: a frame; a floating table movable relative to said frame; a guiding structure pivotally mounted on a vertical axis of said floating table; a templet having a single marginal contour edge; a guide roller engaging a contour edge of said templet, said guide roller being pivoted to said guiding structure on said vertical axis; a driving roller carried by said pivoted guiding structure and engaging a face of said templet in back of its marginal contour edge, said driving roller lying in a plane which is perpendicular to the plane of said templet and nonparallel to the tangent to said contour edge at the point of contact of said guide roller and said edge; means for rotating said driving roller; and means secured to said floating table and adapted to operate on a piece of work, said driving roller being offset relative to said vertical axis so as to be bodily movable with said guiding structure about said vertical axis.

6. In a device of the nature disclosed, the combination of: a frame; longitudinal ways in said frame; transverse ways supported by said longitudinal ways; a floating table carried by said ways; a guiding structure pivoted about a central vertical axis of said floating table; a templet carried by said frame and having a single marginal contour edge; a guide roller pivoted to said guiding frame about said vertical axis, said guide roller engaging the contour edge of said templet; a driving roller carried by said guiding structure in offset relation to said vertical axis, said driving roller engaging the under flat face of said templet in back of its marginal contour edge; means for rotating said driving roller; a follower roller engaging the upper flat face of said templet in back of said marginal contour edge; and means rigidly secured to said floating table for operating on a piece of work.

7. In a machine of the nature disclosed, the combination of: a templet having a single marginal contour edge; a guide means engaging said contour edge of said templet; and a driving roller engaging a flat surface of said templet in back of said marginal contour edge, said roller being perpendicular to said surface and disposed in a plane angled obliquely to the tangent to the contour edge of said templet at a point of contact between said edge and said guide means, so as to have a frictional slipping engagement with said flat surface, tending to advance said guide means along said contour edge and to maintain said guide means in contact with said contour edge.

In testimony whereof, I have hereunto set my hand at Denver, Colorado, this 4 day of February 1928.

CHESTER MOTT.